US011125348B2

(12) United States Patent
Groza et al.

(10) Patent No.: US 11,125,348 B2
(45) Date of Patent: Sep. 21, 2021

(54) SLAM-SHUT SAFETY ASSEMBLY FOR PROVIDING REDUNDANT SAFETY SHUTOFF

(71) Applicant: EMERSON PROCESS MANAGEMENT REGULATOR TECHNOLOGIES, INC., McKinney, TX (US)

(72) Inventors: Emil Groza, Cluj-Napoca (RO); Eva Gota, Cluj-Napoca (RO); Nikita Jose Paredes Nesmashnaya, Chartres (FR); Adina Todea, Cluj-Napoca (RO); Michel Bouvry, Chartres (FR)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 23 days.

(21) Appl. No.: 16/574,602

(22) Filed: Sep. 18, 2019

(65) Prior Publication Data
US 2020/0116270 A1    Apr. 16, 2020

(30) Foreign Application Priority Data
Oct. 10, 2018  (RO) .............................. a 2018 00789

(51) Int. Cl.
*F16K 17/04*      (2006.01)
*F16K 17/02*      (2006.01)

(52) U.S. Cl.
CPC .......... *F16K 17/048* (2013.01); *F16K 17/025* (2013.01); *Y10T 137/86485* (2015.04)

(58) Field of Classification Search
CPC ...... F16K 17/048; F16K 17/025; F16K 3/246; F16K 3/267; F16K 3/26; Y10T 137/7841; Y10T 137/86485; Y10T 137/7723
(Continued)

(56) References Cited
U.S. PATENT DOCUMENTS

| 1,950,575 A | * | 3/1934 | Smolensky | ........... F16K 15/063 |
| | | | | 137/512.1 |
| 2,349,137 A | * | 5/1944 | Brown | .................... F16K 17/19 |
| | | | | 137/493.5 |

(Continued)

FOREIGN PATENT DOCUMENTS

| DE | 202008006704 U1 | 9/2009 |
| FR | 1048425 A | 12/1953 |

OTHER PUBLICATIONS

International Search Report received for PCT/US2019/053346, dated Jan. 7, 2020.
(Continued)

*Primary Examiner* — Craig M Schneider
*Assistant Examiner* — Frederick D Soski
(74) *Attorney, Agent, or Firm* — Marshall, Gerstein & Borun LLP

(57) ABSTRACT

A slam-shut safety assembly configured to provide redundant safety shutoff in a gas distribution system. The slam-shut safety assembly includes a valve body, a first slam-shut safety device coupled to the valve body, and a second slam-shut safety device coupled to the valve body. The valve body has an inlet, an outlet, and defines a flow path extending between the inlet and the outlet. The first slam-shut safety device is configured to block the flow path at a first position responsive to an overpressure condition or an underpressure condition. The second slam-shut safety device is configured to block the flow path at a second position responsive to the overpressure condition or the underpressure condition.

24 Claims, 5 Drawing Sheets

(58) Field of Classification Search
USPC .................................................. 251/324
See application file for complete search history.

(56) References Cited

U.S. PATENT DOCUMENTS

| | | | | |
|---|---|---|---|---|
| 3,304,952 | A * | 2/1967 | Krone | B60P 3/2255 |
| | | | | 137/493.9 |
| 3,527,246 | A * | 9/1970 | Petersen | F16K 1/38 |
| | | | | 137/512.2 |
| 4,068,680 | A * | 1/1978 | Sliger | F16K 15/04 |
| | | | | 137/512.1 |
| 4,134,421 | A | 1/1979 | Cameron | |
| 4,693,269 | A * | 9/1987 | Yamada | F16K 15/033 |
| | | | | 137/484.2 |
| 4,699,171 | A * | 10/1987 | Sugden | F16K 17/0473 |
| | | | | 137/468 |
| 8,225,812 | B2 | 7/2012 | Faillat et al. | |
| 8,256,446 | B2 * | 9/2012 | Hawkins | G05D 16/0683 |
| | | | | 137/116.5 |
| 8,286,660 | B2 * | 10/2012 | Mevius | G05D 16/0694 |
| | | | | 137/484.8 |
| 9,133,946 | B2 * | 9/2015 | Nguyen | F16K 17/32 |
| 9,145,904 | B2 * | 9/2015 | Griffin, Jr. | G05D 16/16 |
| 9,200,722 | B2 * | 12/2015 | Fan | F16K 31/1262 |
| 9,213,339 | B2 * | 12/2015 | Nashery | G05D 16/0672 |
| 2002/0100501 | A1 * | 8/2002 | Hollister | E21B 34/16 |
| | | | | 137/102 |
| 2009/0255591 | A1 * | 10/2009 | Grout | F16K 51/02 |
| | | | | 137/334 |
| 2009/0260697 | A1 * | 10/2009 | Mevius | G05D 16/0694 |
| | | | | 137/484.2 |
| 2010/0038570 | A1 * | 2/2010 | Nalini | F16K 31/04 |
| | | | | 251/129.11 |
| 2010/0071786 | A1 * | 3/2010 | Hawkins | G05D 16/02 |
| | | | | 137/485 |
| 2010/0258754 | A1 * | 10/2010 | Haines | F16K 51/00 |
| | | | | 251/153 |
| 2011/0079292 | A1 * | 4/2011 | Nunez | B65D 90/36 |
| | | | | 137/68.19 |
| 2011/0174381 | A1 * | 7/2011 | Foust | G05D 16/02 |
| | | | | 137/1 |
| 2011/0272615 | A1 * | 11/2011 | Taylor | F16J 15/104 |
| | | | | 251/324 |
| 2012/0261005 | A1 * | 10/2012 | Cojocaru | F16K 17/32 |
| | | | | 137/461 |
| 2014/0083513 | A1 * | 3/2014 | Zhou | G05D 16/0688 |
| | | | | 137/2 |
| 2014/0083519 | A1 * | 3/2014 | Fan | G05D 7/0106 |
| | | | | 137/15.18 |
| 2014/0083528 | A1 * | 3/2014 | Mevius | F16K 17/32 |
| | | | | 137/505 |
| 2014/0083530 | A1 * | 3/2014 | Fan | G05D 16/0638 |
| | | | | 137/505.18 |
| 2014/0090717 | A1 * | 4/2014 | Mevius | G05D 16/02 |
| | | | | 137/12 |
| 2014/0090719 | A1 * | 4/2014 | Mevius | F16K 17/042 |
| | | | | 137/15.24 |
| 2014/0090724 | A1 * | 4/2014 | Mevius | F16K 17/042 |
| | | | | 137/488 |
| 2014/0090726 | A1 * | 4/2014 | Hawkins | G05D 16/0683 |
| | | | | 137/505.13 |
| 2014/0090727 | A1 * | 4/2014 | Nguyen | G05D 16/0694 |
| | | | | 137/505.18 |
| 2014/0130884 | A1 * | 5/2014 | Sanders | F16K 1/36 |
| | | | | 137/12 |
| 2014/0261724 | A1 * | 9/2014 | Fan | F16K 31/1262 |
| | | | | 137/15.01 |
| 2014/0346384 | A1 * | 11/2014 | Roper | F16K 31/126 |
| | | | | 251/205 |
| 2015/0122352 | A1 * | 5/2015 | Matthews | G05D 16/185 |
| | | | | 137/505 |
| 2015/0123024 | A1 * | 5/2015 | Bouvry | F16K 1/46 |
| | | | | 251/332 |
| 2015/0212525 | A1 * | 7/2015 | Bartha | G05D 16/0636 |
| | | | | 137/505.12 |
| 2015/0234395 | A1 * | 8/2015 | Fan | G05D 16/106 |
| | | | | 137/505.18 |
| 2015/0277451 | A1 * | 10/2015 | Huo | G05D 16/0655 |
| | | | | 137/505 |
| 2015/0285402 | A1 * | 10/2015 | Roper | F16K 47/04 |
| | | | | 251/333 |
| 2015/0316166 | A1 * | 11/2015 | Crutsinger | F16L 55/07 |
| | | | | 251/75 |
| 2015/0355642 | A1 * | 12/2015 | Sanders | G05D 7/012 |
| | | | | 137/484.2 |
| 2016/0069469 | A1 * | 3/2016 | Sanders | G05D 16/02 |
| | | | | 251/28 |
| 2016/0097461 | A1 * | 4/2016 | Hawkins | F16K 17/042 |
| | | | | 137/463 |
| 2016/0123487 | A1 * | 5/2016 | Gota | G05D 16/10 |
| | | | | 137/461 |
| 2016/0258538 | A1 * | 9/2016 | Liu | F16K 1/42 |
| 2016/0290529 | A1 * | 10/2016 | Hart | F16K 5/08 |
| 2016/0356389 | A1 * | 12/2016 | Masias | F16K 17/02 |
| 2019/0383409 | A1 | 12/2019 | Kotragouda Basappa et al. | |

OTHER PUBLICATIONS

Written Opinion received for PCT/US2019/053346, dated Jan. 7, 2020.

Emerson Process Management: "Type OS2 Slam-Shut Device," Jul. 24, 2013 (Jul. 24, 2013), XPO55614871, Retrieved from the Internet: URL:http://euedocs.emersonprocess.co.uk/groups/public_regsprodlit/documents/instruction_manuals/d102778x012.pdf [retrieved on Aug. 23, 2019].

* cited by examiner

SLAM-SHUT SAFETY ASSEMBLY FOR PROVIDING REDUNDANT SAFETY SHUTOFF

FIELD OF THE DISCLOSURE

The present disclosure generally relates to gas distribution systems and, more particularly, to a slam-shut safety assembly that provides redundant safety shutoff in a gas distribution system.

BACKGROUND

Gas distribution systems, such as systems used to distribute natural gas, typically transport gas from a producer to a consumer along a series of pipes and through a series of valves. Each gas distribution system may include one or more regulator valves that control the pressure of the gas within the distribution system. Normally, the gas is transmitted at a high pressure through the system. However, the pressure of the gas must be reduced prior to final distribution to the consumers. This pressure reduction is typically accomplished at pressure-reducing stations within local networks.

Typically, these pressure-reducing stations include one or more pressure regulating valves (which may be referred to herein as "regulators" or "main regulators") and some sort of safety device to shut off the flow of gas should the pressure regulating valve fail. Most commonly, slam-shut safety valves are used for this purpose. For example, U.S. Pat. No. 4,134,421 discloses a slam-shut safety valve that provides overpressure protection in a pipeline. Another example of a slam-shut safety valve is disclosed in U.S. Pat. No. 8,225,812. The slam-shut safety valve is generally disposed upstream of the pressure regulating valve so that the slam-shut valve may prevent gas from reaching the pressure regulating valve in the event the pressure regulating valve has failed. The slam-shut safety valve monitors gas pressure downstream of the pressure regulating valve. If the downstream pressure deviates from a predetermined range (i.e., is above an upper pressure limit or below a lower pressure limit), the slam-shut safety valve closes, cutting off the flow of gas to the pressure regulating valve and preventing uncontrolled gas pressures downstream of the pressure-reducing station as a result of the pressure regulating valve failure.

SUMMARY

One aspect of the present disclosure includes a slam-shut safety assembly configured to provide redundant safety shutoff in a gas distribution system. The slam-shut safety assembly includes a valve body, a first slam-shut safety device coupled to the valve body, and a second slam-shut safety device coupled to the valve body. The valve body has an inlet, an outlet, and defines a flow path extending between the inlet and the outlet. The first slam-shut safety device is configured to block the flow path at a first position responsive to an overpressure condition or an underpressure condition. The second slam-shut safety device is configured to block the flow path at a second position responsive to the overpressure condition or the underpressure condition.

Another aspect of the present disclosure includes a slam-shut safety assembly configured to provide redundant safety shutoff in a gas distribution system. The assembly includes a valve body, a first slam-shut safety device coupled to the valve body, and a second slam-shut safety device coupled to the valve body. The valve body has an inlet, an outlet, and defines a flow path extending between the inlet and the outlet, the valve body including a first slam-shut valve seat defining a first orifice that forms a first part of the flow path between the inlet and the outlet, and the valve body including a second slam-shut valve seat defining a second orifice that forms a second part of the flow path between the inlet and the outlet. The first slam-shut safety device includes a first control element and a first valve stem operatively coupled to the first control element. The first control element is movable along a slam-shut axis between an open first position, in which the first control element is spaced away from the first slam-shut valve seat, thereby allowing fluid flow through the first orifice, and a closed second position, in which the first control element is seated against the first slam-shut valve seat, thereby preventing fluid flow through the first orifice. The second slam-shut safety device includes a second control element movably disposed within the valve body and a second valve stem operatively coupled to the second control element. The second control element is movable along the slam-shut axis between an open first position, in which the second control element is spaced away from the second slam-shut valve seat, thereby allowing fluid flow through the first orifice, and a closed second position, in which the second control element is seated against the second slam-shut valve seat, thereby preventing fluid flow through the second orifice.

Another aspect of the present disclosure includes a slam-shut safety assembly configured to provide redundant safety shutoff in a gas distribution system. The assembly includes a valve body, a first slam-shut safety device coupled to the valve body, and a second slam-shut safety device coupled to the valve body. The valve body has an inlet, an outlet, and defines a flow path extending between the inlet and the outlet, the valve body including a first slam-shut valve seat defining a first orifice that forms a first part of the flow path between the inlet and the outlet, and the valve body including a second slam-shut valve seat defining a second orifice that forms a second part of the flow path between the inlet and the outlet. The first slam-shut safety device includes a first bonnet coupled to the valve body and including a first sleeve extending into the flow path, a first control element movably disposed within the first sleeve, and a first valve stem operatively coupled to the first control element at its first end and to a first trigger mechanism at its second end, the first trigger mechanism responsive to pressure. The first control element is movable along a slam-shut axis between an open first position, in which the first control element is spaced away from the first slam-shut valve seat, thereby allowing fluid flow through the first orifice, and a closed second position, in which the first control element is seated against the first slam-shut valve seat, thereby preventing fluid flow through the first orifice. The second slam-shut safety device includes a second bonnet coupled to the valve body and including a second sleeve extending into the flow path, a second control element movably disposed within the valve body, and a second valve stem operatively coupled to the second control element at its first end and to a second trigger mechanism at its second end, the second trigger mechanism responsive to pressure. The second control element is movable along the slam-shut axis between an open first position, in which the second control element is spaced away from the second slam-shut valve seat, thereby allowing fluid flow through the first orifice, and a closed second position, in which the second control element is seated against the second slam-shut valve seat, thereby preventing fluid flow through the second orifice. Each of the first and second control elements is pressure balanced.

Additional optional aspects, arrangements, examples, and features are disclosed, which may be arranged in any functionally appropriate manner, either alone or in any functionally viable combination, consistent with the teachings of the disclosure. Other aspects and advantages will become apparent upon consideration of the following detailed description.

DETAILED DESCRIPTION

Figure 1:
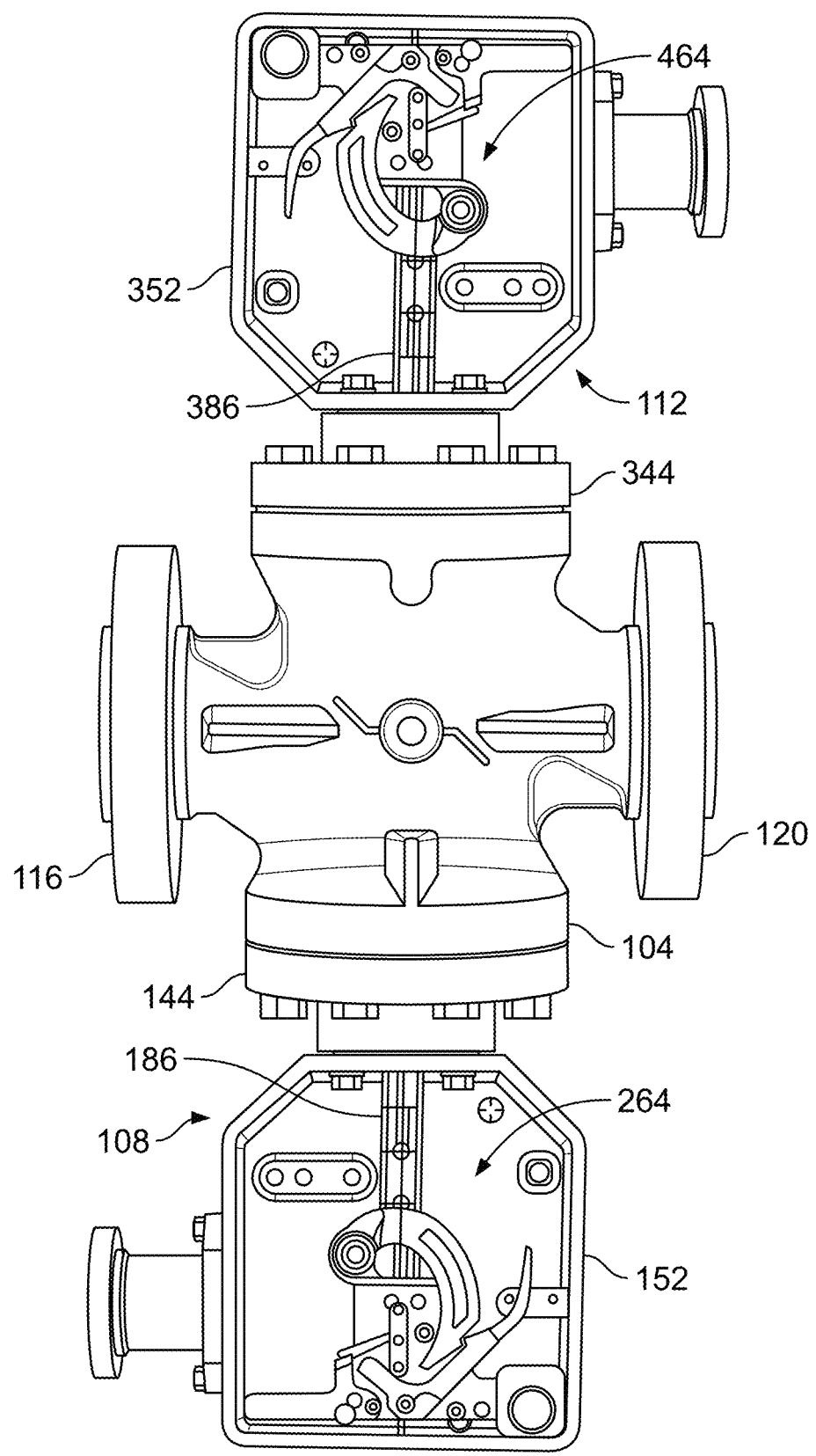
FIG. 1 is a partial cross-sectional view of a slam-shut safety assembly constructed in accordance with the teachings of the present disclosure, the slam-shut safety assembly including first and second slam-shut safety devices.

Industry regulations in various jurisdictions require gas distribution systems to include one or more pressure regulators and multiple safety devices, which can be a combination of monitor systems, slam shut devices, and relief valves. However, these safety devices can take up a considerable amount of space and can be quite costly.

The present disclosure is thus directed to a slam-shut safety assembly that helps meet these regulations but does so in a compact way. The slam-shut safety assembly includes two slam-shut safety devices incorporated into a single, compact body. Each of the two slam-shut safety devices is configured to redundantly provide a safety shutoff capability in the event that a main regulator in the gas distribution system fails. Thus, even in the event that both the main regulator and one of the two slam-shut safety devices fail, the other slam-shut safety device is able to provide a safety shutoff.

FIGS. 1-5 illustrate one example of a slam-shut safety assembly 100 constructed in accordance with the teachings of the present disclosure. The slam-shut safety assembly 100 is configured for use in conjunction with a main regulator in a gas distribution system (not shown) to provide a safety shutoff capability in the event the main regulator fails. The slam-shut safety assembly 100 generally includes a valve body 104, a first slam-shut safety device 108 coupled to the valve body 104, and a second slam-shut safety device 112 coupled to the valve body 104 as well. In other words, the first and second slam-shut safety devices 108, 112 share a common valve body—the valve body 104.

While not illustrated herein, the first slam-shut safety device 108 (in particular, the actuator 152 of the slam-shut safety device 108) is coupled via a first connection to a point downstream of the main regulator. Similarly, the second slam-shut safety device 112 (in particular, the actuator 352 of the slam-shut safety device 112) is coupled via a second connection to a point downstream of the main regulator. To ensure that the slam-shut safety devices 108 and 112 are fully redundant, the second connection is separate, or independent, from the first connection. The first slam-shut safety device 108 is configured to provide a safety shutoff capability by closing the valve body 104 in the event the main regulator fails. The second slam-shut safety device 112 is likewise configured to provide a safety shutoff capability by closing the valve body 104 in the event the main regulator fails. However, the first and second slam-shut safety devices 108, 112 each provide safety shutoff independently of one another, such that the second slam-shut safety device 112 serves as a redundant slam-shut safety device capable of providing redundant safety shutoff in the event that the first slam-shut safety device 108 also fails (and the first slam-shut safety device 108 serves as a redundant slam-shut safety device in the event the second slam-shut safety device 112 also fails).

Figure 2:
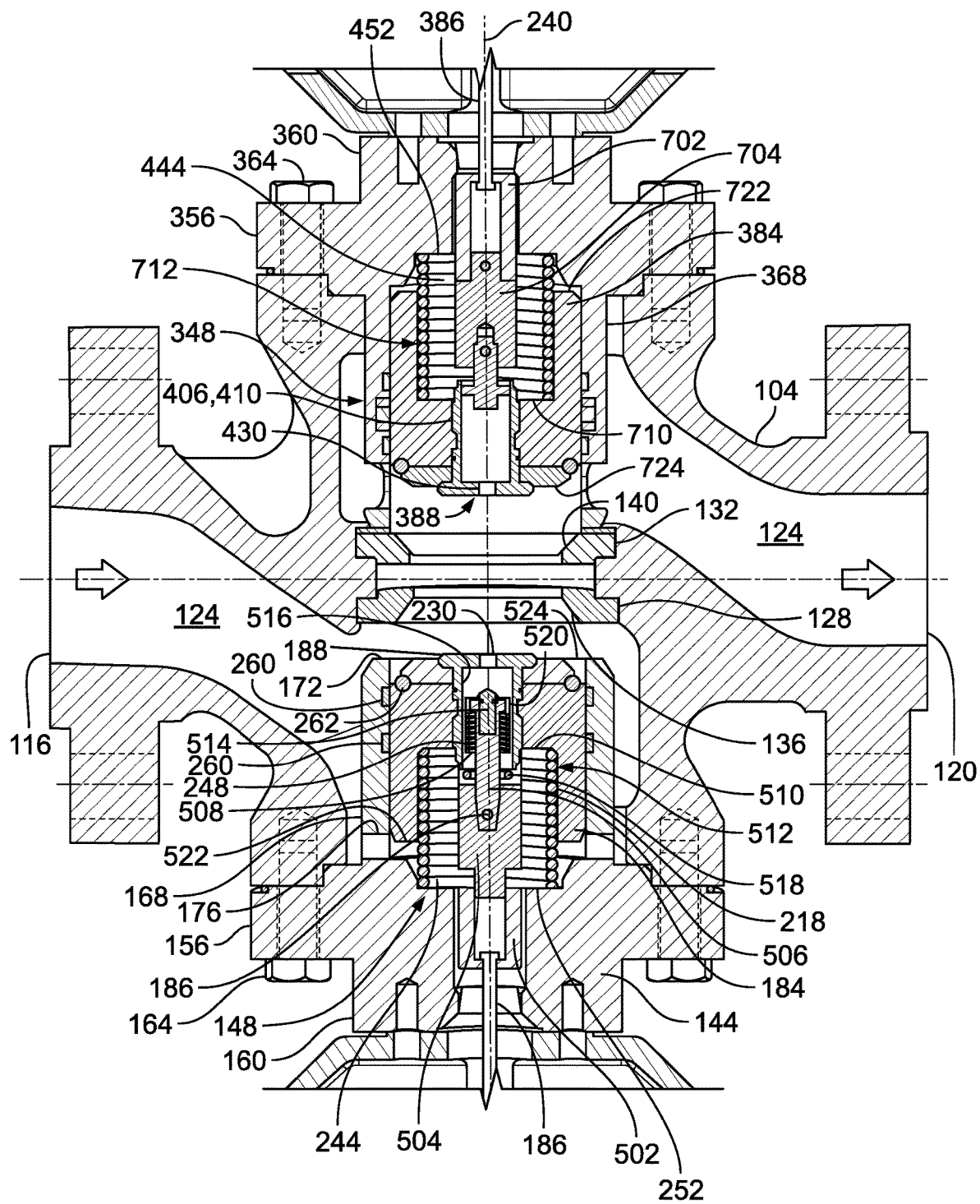
FIG. 2 is a cross-sectional view of the slam-shut safety assembly of FIG. 1, but with the first and second actuators of the first and second slam-shut safety devices, respectively, removed for clarity and showing the first and second control elements of the first and second slam-shut safety devices, respectively, in open positions.
Figure 3:
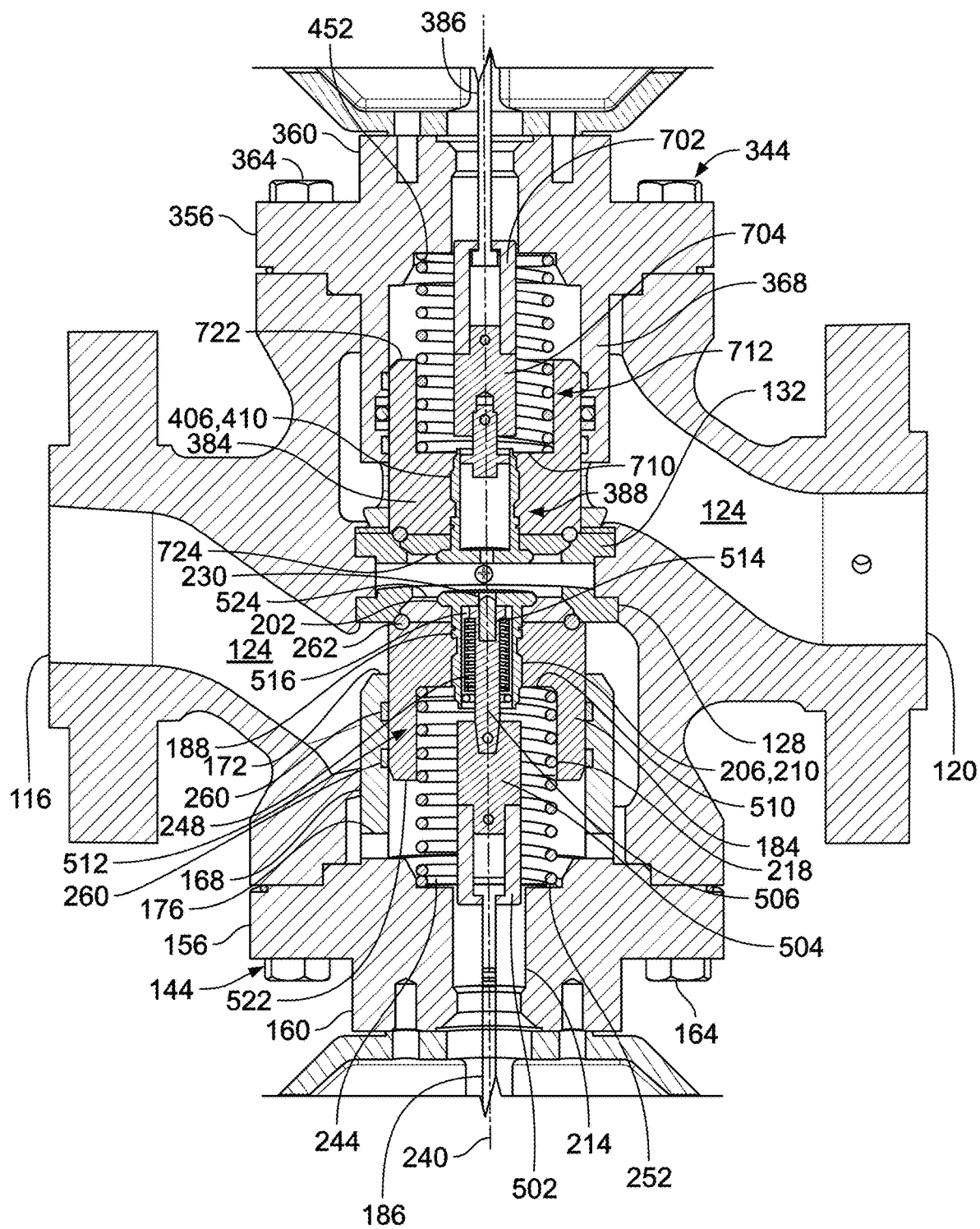
FIG. 3 is similar to FIG. 2 but shows the first and second control elements in closed positions.

As best illustrated in FIGS. 2 and 3, the valve body 104 has a fluid inlet 116 and a fluid outlet 120 connected by a fluid passage forming a flow path 124. In this example, two slam-shut valve seats 128, 132 are disposed within the valve body 104, one for each of the first and second slam-shut safety devices 108, 112. The first slam-shut valve seat 128, which may be removably or fixedly disposed within the valve body 104, defines a first flow orifice 136 that forms a first portion of the flow path 124. The second slam-shut valve seat 132, which may be removably or fixedly disposed within the valve body 104, defines a second flow orifice 140 that forms a second portion of the flow path 124. The first and second slam-shut valve seats 128, 132 are aligned with one another along a common axis, though they need not be. In other examples, one slam-shut valve seat may be used in place of the two slam-shut valve seats 128, 132 by both the first and second slam-shut safety devices 108, 112. In any case, it will be appreciated that fluid flowing through the valve body 104 flows from the fluid inlet 116 to the fluid outlet 120 via or through the flow path 124 (including the first and second flow orifices 136, 140).

Referring to FIGS. 1-4, the first slam-shut safety device 108 in this example includes a first bonnet 144 coupled to a first port of the valve body 104, a first control assembly 148, and the first actuator 152, which is operatively coupled to the valve body 104 via the first bonnet 144. However, in other examples, the first slam-shut safety device 108 can include more, less, or different components. As an example, the first slam-shut safety device 108 may include a different bonnet 144 or a different actuator 152.

Figure 4:
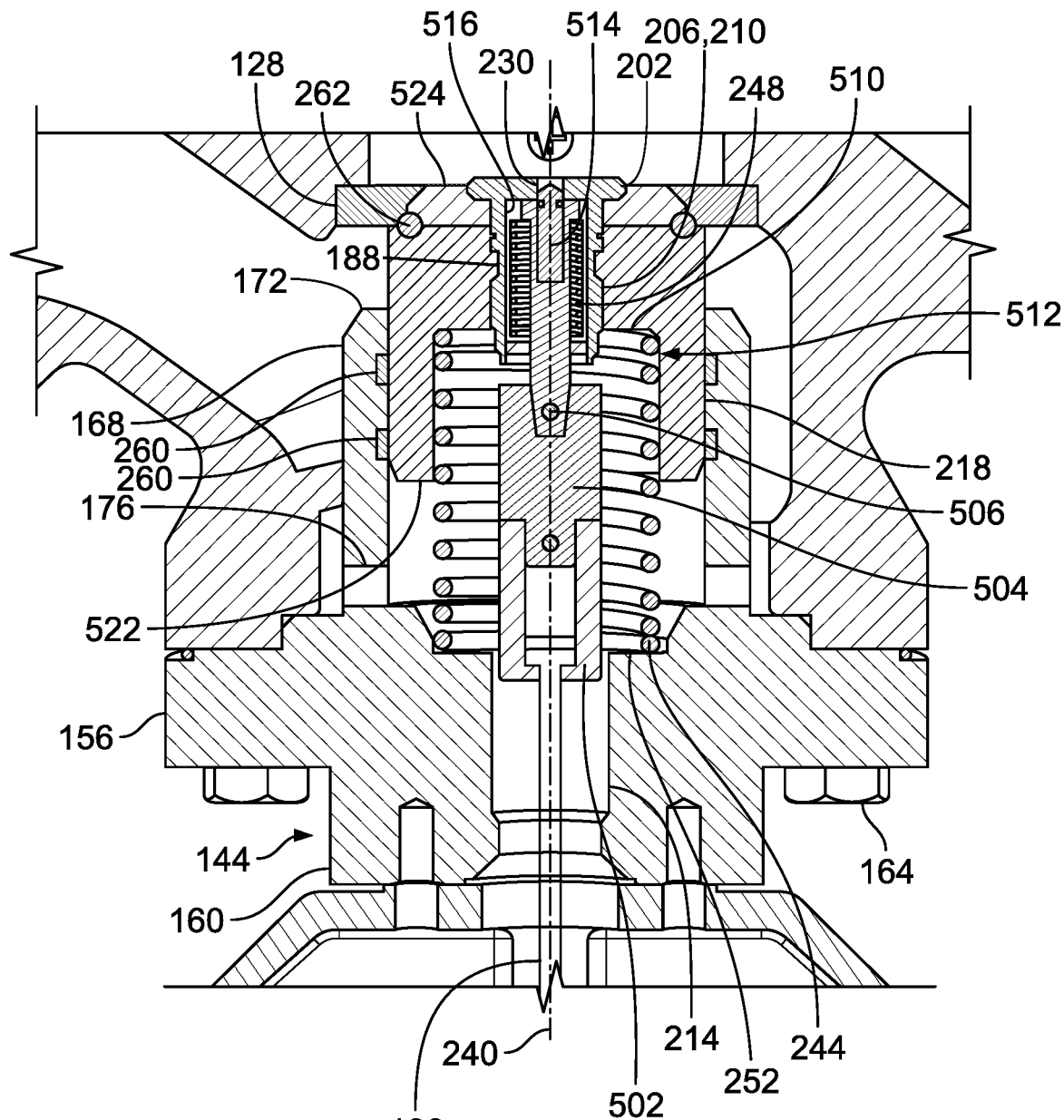
FIG. 4 is a close-up view of components of the first slam-shut safety device of the slam-shut safety assembly of FIG. 1 when the first control element is in the closed position.

As best illustrated in FIGS. 2-4, the first bonnet 144 in this example has a flanged portion 156 and a neck portion 160 that extends outward (downward, in FIGS. 2 and 3) from the flanged portion 156. In this example, the first bonnet 144 is coupled to the valve body 104 by securing the flanged portion 156 to the valve body 104 via a plurality of fasteners 164. In other examples, however, the first bonnet 144 can be coupled to the valve body 104 in a different manner. The first bonnet 144 in this example also includes a sleeve 168 that is coupled to (e.g., integrally formed with) and extends outward (upward, in FIGS. 2 and 3) from the flanged portion 156. Thus, the sleeve 168 extends into the valve body 104 and into the flow path 124, such that an end 172 of the sleeve 168 is positioned proximate to but spaced from the first slam-shut valve seat 128. While not illustrated herein, the first bonnet 144 can, as is known in the art, include valve packing, one or more packing rings, and one or more packing flanges.

The first control assembly 148 in this example includes a first control element 184 and a first valve stem 186 operatively coupled to the control element 184. The first control element 184 is generally movably disposed within the first sleeve 168 (i.e., the first sleeve 168 at least partially surrounds the first control element 184). In this example, the first control element 184 takes the form of a valve plug, though the first control element 184 may instead take the form of a valve disc or other control element. The first control element 148 further includes a first bypass body 188 that is generally defined by an annular head 202 and a cylindrical body 206 that extends outward (downward, in FIGS. 2-4) from the annular head 202. The annular head 202 is seated against or on the first control element 184 such that the cylindrical body 206 is disposed in a first bore 210 formed in the first control element 184. A first bypass rod 506 is at least partially positioned within an internal portion of the cylindrical body 206 of the first bypass body 188. The first bypass rod 506 is coupled to a first rod collar 504, which in this example partially surrounds the first bypass rod 506. The first rod collar 504 is, in turn, coupled to a first stem collar 502, which in this example partially surrounds the first rod collar 504. The first stem collar 502 is, in turn, coupled to the first valve stem 186, such that the first valve stem 186 is operatively coupled to the first control element 184 via the first bypass body 188. In other examples, however, the first valve stem 186 may be operatively coupled to the first control element 184 in a different manner, e.g., using more or less components and/or differently arranged components. As an example, the first valve stem 186 may be directly coupled to the first bypass body 188, i.e., without utilizing the first stem collar 502, the first rod collar 504, and the first bypass rod 506.

As illustrated, the first bonnet 144 in this example includes one or more flow ports 176 formed in the sleeve 168 at a position immediately adjacent the flanged portion 156. The one or more flow ports 176 permit fluid at the valve inlet 116 to enter a first control element cavity 512. The first control element cavity 512 comprises a volume within a bore 218 in the first control element 184 and within a bore 516 in the bypass body 188 (channels 518 and 520 permit fluid in the first control element cavity 512 to flow around the bypass rod 506), which volume is fluidly coupled to the interior of the valve body 104 via the flow ports 176 and an aperture 230 formed in the annular head 202 of the bypass body 188. The first control element cavity 512 exists to pressure-balance the first control element 184 as fluid pressure in the first control element cavity 512 acts upon the first control element 184 in a first direction while fluid pressure outside of the sleeve 168 acts upon the first control element 184 in a second direction opposite the first direction. In other words, fluid pressure in the first control element cavity 512 urges a first side 522 of the first control element 184 toward the seat 128 while the fluid pressure outside of the sleeve 168 urges a second side 524 of the first control element 184 opposite the first side 520 away from the seat 128.

The first valve stem 186 extends through a bore 214 in the first bonnet 144 such that its first end is coupled to the first stem collar 502 and its second end is coupled to a trigger mechanism within the actuator 152 of the first slam-shut safety device 108.

When the first slam-shut safety device 108 is in operation, the first control element 184, the first valve stem 186, the first bypass body 188, the first bypass rod 506, the first rod collar 504, and the first stem collar 502 are movable relative to the first slam-shut valve seat 128 and the sleeve 168 to control fluid flow through the valve body 104. More particularly, the first control element 184, the first valve stem 186, the first bypass rod 506, the first rod collar 504, and the first stem collar 502 are movable within the valve body 104, along a slam-shut axis 240, between a first position, shown in FIG. 2, and a second position, shown in FIGS. 3 and 4. In the first position, the first control element 184 (and the second side 524 in particular) is spaced from the first slam-shut valve seat 128, thereby opening the first fluid orifice 136 and allowing fluid flow between the fluid inlet 116 and the fluid outlet 120. In the second position, the first control element 184 (and the second side 524 in particular) is positioned in sealing engagement with the first slam-shut valve seat 128, thereby closing the first fluid orifice 136 and preventing fluid flow between the fluid inlet 116 and the fluid outlet 120.

The first slam-shut safety device 108 also includes a first control biasing element 244 and a bypass biasing element 248. The first control biasing element 244, which in this example takes the form of a spring, is positioned to apply a biasing force to the first control element 184 to urge the first control element 184 toward the second, closed position. In this example, the first control biasing element 244 is partially disposed within the bore 218 of the first control element 184 and has one end that bears against a shoulder 252 of the first bonnet 144 (particularly the flanged portion 156) and another end that bears against a shoulder 510 of the first control element 184. In other examples, however, the first control biasing element 244 can be arranged in a different manner. As an example, the first control biasing element 244 can be seated against an outer surface of the first control element 184 instead of against the shoulder surface 510 within the first control element 184. Meanwhile, the bypass biasing element 248, which in this example also takes the form of a spring, is positioned to apply a biasing force to the first bypass rod 506 to urge the first bypass rod 506 toward the annular head 202 of the first bypass body 188 and the aperture 230 formed in the annular head 202. In this example, the bypass biasing element 248 is disposed entirely within the bypass body 188 and surrounds a portion of the first bypass rod 506. In other examples, however, the bypass biasing element 248 can be arranged in a different manner.

When the first slam-shut safety device 108 is in operation, retraction of the first valve stem 186 (in the downward direction in FIGS. 1-4) retracts the first stem collar 502, the first rod collar 504, and the first bypass rod 506, thereby compressing the bypass biasing element 248 against a first bypass spring shoulder 508. When the bypass biasing element 248 is fully compressed against the first bypass spring shoulder 508, continued retraction of the first valve stem 186 causes retraction of the first bypass body 188, which ultimately causes retraction of the first control element 184 against the first control biasing element 244.

The first control assembly 148 also includes a plurality of seals arranged to effectuate seals between the various components of the first slam-shut safety device 108. In this example, the first control assembly 148 includes two sealing elements 260, e.g., sealing gaskets, disposed in the first sleeve 168 to effectuate a seal between the first sleeve 168 and the first control element 184, thereby preventing fluid from leaking out therebetween. In this example, the first control assembly 148 also includes a sealing element 262, e.g., an O-ring, carried on an external surface of the first control element 184 to facilitate sealing engagement with the first slam-shut valve seat 128 when the first control element 184 is in the second position. In other examples, the first control assembly 148 may include more, less, or different sealing elements.

As illustrated in FIG. 1, the second end of the first valve stem 186 is coupled to a trigger mechanism 264 within the first actuator 152 of the first slam-shut safety device 108. The first actuator 152 in this example is a release relay type actuator. Further details regarding the release relay type actuator 152 are described in commonly owned U.S. patent application Ser. No. 16/012,148, titled "Slam-Shut Safety Device for Use in Dirty Service Applications," which is hereby incorporated by reference in its entirety. In other examples, however, the first actuator 152 may instead take the form of a different type of pneumatic actuator or a completely different type of actuator, e.g., a hydraulic actuator, an electric actuator, or a manual actuator.

As discussed in the '148 application, the first actuator 152 is configured to detect fluid pressure at a position downstream of the first slam-shut safety device 108 (e.g., via the first connection) and to actuate the first slam-shut safety device 108 (i.e., cause the first control element 184 to transition from the first, open position to the second, closed position) based on the fluid pressure. In particular, the first actuator 152 is configured to detect an overpressure condition (which occurs when the downstream pressure exceeds a pre-determined maximum pressure) or an underpressure condition (which occurs when the downstream pressure is less than a pre-determined minimum pressure), each of which may indicate that the main regulator has failed. In a first, armed state (as shown in FIGS. 1 and 2) the first valve stem 186 is held in a retracted position (i.e., away from the valve body 104) by the trigger mechanism 264 such that the first control biasing element 244 and the bypass biasing element 248 are both maintained in their compressed, active states and the first control element 184 is in its first position (spaced from the first slam-shut valve seat 128). When an overpressure or underpressure condition occurs, the trigger mechanism 264 releases the first valve stem 186, which permits the first control biasing element 244 to drive the first control element 184 to its second position (seated against the first slam-shut valve seat 128) to prevent fluid from flowing through the flow path 124, and permits the bypass biasing element 248 to drive the first bypass rod 506 toward the first bypass body 188 (as shown in FIG. 3). As illustrated in FIG. 3, when the bypass biasing element 248 is in its extended position, a bypass insert 514 contacts and closes the aperture 230 in the bypass body 188, thus preventing fluid flow through the first control element cavity 512, which would otherwise defeat the shutoff functionality of the first slam-shut device 108. In turn, the first side 520 of the first control element 184 is fluidly isolated from the second side 524 of the first control element 184.

When the overpressure condition or the underpressure condition has been corrected and shutoff is no longer needed, the first slam-shut safety device 108 can be manually reset to re-establish flow through the flow path 124 (and fluidly connect the first side 520 of the first control element 184 with the second side 524 of the first control element 184), as also discussed in the '148 application. The first slam-shut safety device 108 is manually reset by moving the first valve stem 186 back to its retracted and armed state (e.g., via the trigger mechanism 264). Note that when the first slam-shut device 108 is in the closed position (as shown in FIG. 3), fluid pressure in the first control element cavity 512 (i.e., the fluid inlet pressure) acts to urge the first control element 184 toward the seat 128, which ensures that the first control element 184 stays in contact with the seat 128 to prevent fluid flow through the flow path 124. However, the potential pressure differential across the first control element 184 (i.e., the differential between the first control element cavity 512 and the interior of the valve body 104 downstream of the seat 128) might make it difficult to manually retract the valve stem 186, especially for larger valve bodies. To overcome this pressure differential, the initial retraction of the valve stem 186 draws the bypass rod 506 back against the bypass biasing element 248 (while the first control element 184 is still positioned against the seat 128), which moves the bypass insert 514 away from the aperture 230, thus removing the pressure differential across the first control element 184 and permitting continued manual retraction of the first valve stem 186. When the bypass biasing element 248 is fully compressed, continued retraction of the first stem 186 then moves the first control element 184 away from the first slam-shut valve seat 128 along the slam-shut axis 240, shifting the first control element 184 and the first valve stem 186 from the second position back to the first position and compressing the first control biasing element 244.

Referring now to FIGS. 1-3 and 5, the second slam-shut safety device 112 in this example is substantially similar to the first slam-shut safety device 108, with corresponding components labeled using the same reference numerals but increased by 200 (labels are not shown in some instances for purposes of clarity), but is different in the ways described below.

First, the second bonnet 344 of the second slam-shut safety device 112 is slightly different than the first bonnet 144. In particular, the sleeve 368 of the second bonnet 344 extends into the valve body 104 and into the flow path 124 such that an end 372 of the sleeve 368 is positioned against, or engages, the second slam-shut valve seat 132. A flat gasket 373 or other sealing element is disposed between the end 372 of the sleeve 368 and the second slam-shut valve seat 132 to prevent fluid from leaking out therebetween. Moreover, while the second bonnet 344 includes one or more flow ports 376 formed in the sleeve 368, the flow ports 376 are formed at a position immediately adjacent the end 372 of the sleeve 368 (rather than at a position immediately adjacent the flanged portion 356).

Second, although the second bonnet 344 of the second slam-shut safety device 112 is, like the first bonnet 144, coupled to the valve body 104, the second bonnet 344 is coupled to a second port of the valve body 104 that is different from the first port to which the first bonnet 144 is coupled. In this example, the second port is aligned with but directly opposite the first port, such that the first and second bonnets 144, 344 are coupled to opposite portions of the valve body 104. In other examples, however, the first and second ports need not be aligned and/or opposite one another. Specifically, the first slam-shut safety device 108 is positioned on an inlet side of the valve body 104 and the second slam-shut safety device 112 is positioned on an outlet side of the valve body 104 relative to the seats 128 and 132.

Figure 5:
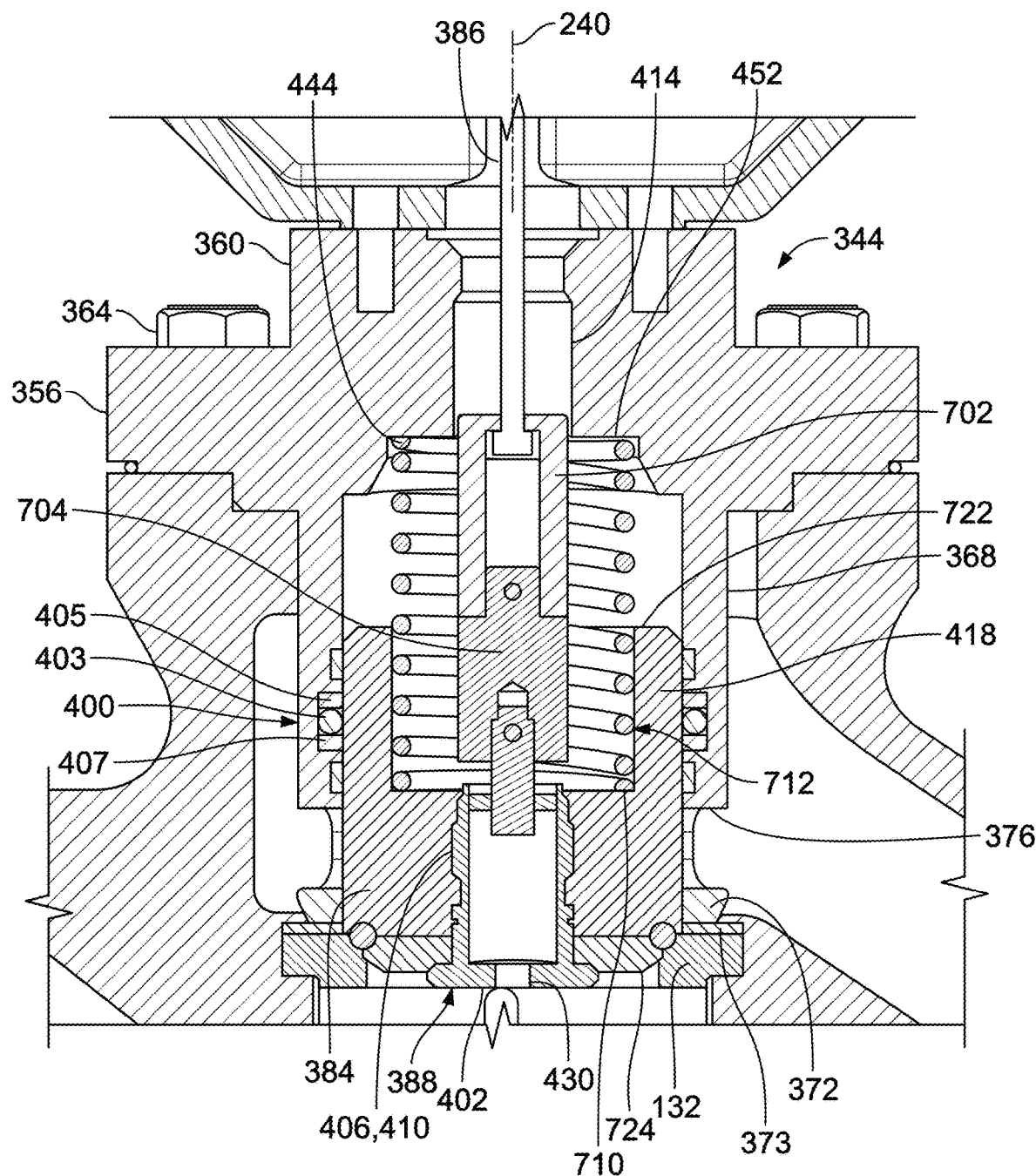
FIG. 5 is a close-up view of components of the second slam-shut safety device of the slam-shut safety assembly of FIG. 1 when the second control element is in the closed position.

Third, the second control assembly 344 also includes a dynamic sealing assembly 400 that is arranged to effectuate a dynamic seal between the second sleeve 368 and the second control element 384. As best illustrated in FIG. 5, the dynamic sealing assembly 400 in this example includes a first seal 403, a second seal 405, and a third seal 407 each arranged in an inner surface of the second sleeve 368. The first seal 403 preferably takes the form of an energized O-ring that is made of an elastomeric material and arranged in a gland formed in the inner surface of the second sleeve 368. Thus, the first seal 403 has an inner surface that engages a radially outward surface of the second control element 384, but does so with minimal friction, and an outer surface that engages an interior portion of the sleeve 368. The second seal 405 and third seal 407, meanwhile, each preferably take the form of a piston ring that is made of a low-friction material (e.g., PTFE). The second and third seals 405, 407 are preferably arranged in the gland so that the first seal 403 is disposed between the second and third seals 405, 407. Thus, like the first seal 403, the second and third seals 405, 407 each have an inner surface that engages the exterior surface of the second control element 384 (again, with minimal friction), and an outer surface that engages an interior portion of the sleeve 368. In other examples, however, the seal assembly 400 may only include one or two seals (e.g., the first seal 403, the second seal 405, a different seal), one or more different seals, and/or differently arranged seals. Moreover, in other examples, the first seal 403, the second seal 405, and/or the third seal 407 can be made of one or more different materials.

Fourth, due to the location of the second slam-shut safety device 112 on the outlet side of the valve body 104 relative to the seats 128 and 132, the second slam-shut safety device 112 must be configured differently from the first slam-shut safety device 108 to achieve balanced pressure on first and second side of the second control element 384. Specifically, if the second slam-shut safety device 112 mirrored the first slam-shut safety device 108, then the flow ports in its sleeve 368 would fluidly communicate with the outlet 120. In such an arrangement, in the closed position, the fluid pressure at the inlet 116 might overcome the force of the second control biasing element 444 and the outlet pressure, which would lift the second control element 384 from the second seat 328 and prevent the second slam-shut safety device 112 from functioning properly. This would only be a significant concern if the first slam-shut safety device 108 failed to function, but, for each device to provide fully redundant protection, the second slam-shut safety device 112 must be configured to function properly independent of the first slam-shut safety device 108. Thus, while the sleeve 368, like the sleeve 168, includes one or more flow ports 376, the flow ports 376, unlike the flow ports 176, do not serve any sort of pressure-balancing function, but instead merely allow fluid to flow therethrough. To ensure that the second control element 384 is balanced, the aperture 430, which mirrors the aperture 230, is open to the second control element cavity 712 regardless of whether the second control element 384 is in the first, open position or the second, closed position, such that the first and second sides 722, 724 of the second control element 384 are in continuous fluid communication with one another. Specifically, the bypass rod 506, the bypass insert 514, and the bypass biasing element 248 that are present in the first control assembly 148 are absent in the second control assembly 348. In other words, the second control assembly 348 only includes one biasing element—the second control biasing element 444.

Notwithstanding these differences between the first slam-shut safety device 108 and the second slam-shut safety device 112, the second slam-shut safety device 112 operates in a substantially identical manner as the first slam-shut safety device 108. Thus, when the second actuator 352, which is identical to the first actuator 152, detects an overpressure condition or an underpressure condition via the second connection, the second valve stem 386 is released, which causes the second control biasing element 444 to drive the second control element 384 along the slam-shut axis 240, toward and into contact with the second slam-shut valve seat 328, thereby closing the second flow orifice 140 and shutting off fluid flow through the flow path 124 in the valve body 104.

Likewise, when the overpressure condition or the underpressure condition has been corrected, and shutoff is no longer needed, the second slam-shut safety device 112 can be manually reset to re-establish flow through the flow path 124. The second slam-shut safety device 112 is manually reset by moving the second valve stem 386 back to its retracted and armed state (e.g., via the trigger mechanism 464). Because the second control element 384 is always pressure-balanced (even in the closed position), there is no pressure-imbalance to overcome when the second slam-shut safety device 112 is manually reset. Rather, retraction of the second valve stem 386 via the trigger mechanism 464 retracts the second control element 384 against the second control biasing element 444, which moves the second control element 384 away from the second slam-shut valve seat 132 along the slam-shut axis 240, shifting the second control element 384 back to the first position.

Based on the foregoing, it will be appreciated that the first and second slam-shut safety devices 108, 112 are each configured to provide safety shutoff in the event that the main regulator in the gas distribution system fails (indicated by an overpressure condition or an underpressure condition). However, the first and second slam-shut safety devices 108, 112 are configured to provide this safety shutoff independently of one another. Thus, when both the first and second slam-shut safety devices 108, 112 are operational, and the main regulator fails, the first and second slam-shut safety devices 108, 112 will simultaneously block the flow path 124 at different, first and second positions along the flow path 124 (when the first and second actuators 152, 352 are set at the same pressure) or will nearly simultaneously block the flow path 124 at different first and second positions along the flow path 124 (when the first and second actuators 152, 352 are set at slightly different pressures). And in the event the main regulator fails and one of the first and second slam-shut safety devices 108, 112 fails as well, the remaining slam-shut safety device 108, 112 would still provide safety shutoff in the gas distribution system.

Each of the optional arrangements described herein may be arranged in any set of combinations or permutations sufficient to provide any combination of one or more functionalities suggested by the description provided herein. Further, it is understood that each of the features disclosed with respect to each exemplary arrangement may be combined in any functional combination, such as to provide any useful combination of functionalities as would be understood by a person of ordinary skill.

While certain representative arrangements of slam-shut devices and details have been described herein for purposes of illustrating the invention, it will be apparent to those skilled in the art that various changes in the devices disclosed may be made without departing from the spirit and scope of the invention, which is defined by the following claims and is not limited in any manner by the foregoing description.

The invention claimed is:

1. A slam-shut safety assembly configured to provide redundant safety shutoff in a gas distribution system, comprising:
a valve body having an inlet, an outlet, and defining a flow path extending between the inlet and the outlet;
a first slam-shut safety device coupled to the valve body and configured to block the flow path at a first position within the valve body responsive to an overpressure condition or an underpressure condition; and
a second slam-shut safety device coupled to the valve body and configured to block the flow path at a second position within the valve body responsive to the overpressure condition or the underpressure condition,
wherein the first slam-shut safety device comprises a first control element movably disposed within the valve body, and
wherein a first side of the first control element is in fluid communication with a second side of the first control element when the first control element is in a first state and the first side of the first control element is isolated from the second side of the first control element when the first control element is in a second state.

2. The assembly of claim 1, wherein the second slam-shut safety device operates independently from the first slam-shut safety device.

3. The assembly of claim 1, wherein the first slam-shut safety device is coupled to a first port of the valve body and the second slam-shut safety device is coupled to a second port of the valve body, the second port being aligned with and opposite the first port.

4. The assembly of claim 1, further comprising:
a first slam-shut valve seat disposed in the valve body, the first slam-shut valve seat defining a first orifice that forms a first part of the flow path; and
a second slam-shut valve seat disposed in the valve body, the second slam-shut valve seat defining a second orifice that forms a second part of the flow path,
wherein the first control element is movable along a slam-shut axis between the first state and the second state, the first state comprising an open first position, in which the first control element is spaced away from the first slam-shut valve seat, thereby allowing fluid flow through the first orifice, and the second state comprising a closed second position, in which the first control element is seated against the first slam-shut valve seat, thereby preventing fluid flow through the first orifice, and
wherein the second slam-shut safety device comprises a second control element movable along the slam-shut axis between an open first position, in which the second control element is spaced away from the second slam-shut valve seat, thereby allowing fluid flow through the second orifice, and a closed second position, in which the second control element is seated against the second slam-shut valve seat, thereby preventing fluid flow through the second orifice.

5. The assembly of claim 4, wherein each of the first and second control elements is pressure-balanced.

6. The assembly of claim 4, wherein the first and second slam-shut valve seats are aligned with but spaced apart from one another within the valve body.

7. An assembly configured to provide redundant safety shutoff in a gas distribution system, comprising:
a valve body having an inlet, an outlet, and defining a flow path extending between the inlet and the outlet, the valve body including a first slam-shut valve seat defining a first orifice that forms a first part of the flow path between the inlet and the outlet, and the valve body including a second slam-shut valve seat defining a second orifice that forms a second part of the flow path between the inlet and the outlet;
a first slam-shut safety device coupled to the valve body, comprising:
a first control element movably disposed within the valve body, the first control element movable along a slam-shut axis between an open first position, in which the first control element is spaced away from the first slam-shut valve seat, thereby allowing fluid flow through the first orifice, and a closed second position, in which the first control element is seated against the first slam-shut valve seat, thereby preventing fluid flow through the first orifice; and
a first valve stem operatively coupled to the first control element; and
a second slam-shut safety device, comprising:
a second control element movably disposed within the valve body, the second control element movable along the slam-shut axis between an open first position, in which the second control element is spaced away from the second slam-shut valve seat, thereby allowing fluid flow through the second orifice, and a closed second position, in which the second control element is seated against the second slam-shut valve seat, thereby preventing fluid flow through the second orifice; and
a second valve stem operatively coupled to the second control element,
wherein a first side of the first control element is in fluid communication with a second side of the first control element when the first control element is in the first open position and the first side of the first control element is isolated from the second side of the first control element when the first control element is in the second closed position.

8. The assembly of claim 7, wherein the second slam-shut safety device prevents fluid flow through the second orifice independently of the first slam-shut safety device preventing fluid flow through the first orifice.

9. The assembly of claim 7, wherein the first slam-shut safety device is coupled to a first port of the valve body and the second slam-shut safety device is coupled to a second port of the valve body, the second port being aligned with and opposite the first port.

10. The assembly of claim 7, wherein the first slam-shut safety device further comprises a first bonnet coupled to the valve body, the first bonnet comprising a first sleeve extending into the flow path, and the first control element movably disposed within the first sleeve between the open first position and the closed second position, and wherein the second slam-shut safety device further comprises a second bonnet coupled to the valve body, the second bonnet comprising a second sleeve extending into the flow path, and the second control element movably disposed within the second sleeve between the open first position and the closed second position.

11. The assembly of claim 7, wherein each of the first and second control elements is pressure-balanced.

12. The assembly of claim 7, wherein the first and second slam-shut valve seats are aligned with but spaced apart from one another within the valve body.

13. The assembly of claim 7, further comprising:
a first bypass body coupled to the first control element and defining a first aperture arranged to facilitate fluid flow from the first side of the first control element to the second side of the first control element; and
a second bypass body coupled to the second control element and defining a second aperture arranged to facilitate fluid flow from a first side of the second control element to a second side of the second control element.

14. The assembly of claim 13, wherein the first side of the second control element is in continuous direct fluid communication with the second side of the first control element.

15. The assembly of claim 7, further comprising a first biasing element arranged to bias the first control element toward the closed second position, and a second biasing element arranged to bias the second control element toward the closed second position.

16. The assembly of claim 7, wherein the first slam-shut safety device comprises a first actuator, the first actuator comprising a first trigger mechanism coupled to the first valve stem, wherein the first trigger mechanism is movable between an armed state, retaining the first valve stem and positioning the first control element in the open first position, and a tripped state, releasing the first valve stem and allowing the first control element to move from the open first position to the closed second position, the first trigger mechanism adapted to move from the armed state to the tripped state responsive to an overpressure condition or an underpressure condition, and wherein second slam-shut safety device comprises a second actuator, the second actuator comprising a second trigger mechanism coupled to the second valve stem, wherein the second trigger mechanism is movable between an armed state, retaining the second valve stem and positioning the second control element in the open first position, and a tripped state, releasing the second valve stem and allowing the second control element to move from the open first position to the closed second position, the second trigger mechanism adapted to move from the armed state to the tripped state responsive to the overpressure condition or the underpressure condition.

17. An assembly configured to provide redundant safety shutoff in a gas distribution system, comprising:
 a valve body having an inlet, an outlet, and defining a flow path extending between the inlet and the outlet, the valve body including a first slam-shut valve seat defining a first orifice that forms a first part of the flow path, and the valve body including a second slam-shut valve seat defining a second orifice that forms a second part of the flow path;
 a first slam-shut safety device, comprising:
  a first bonnet coupled to the valve body, the first bonnet comprising a first sleeve extending into the flow path and one or more first flow ports formed in the first sleeve;
  a first control element movably disposed within the first sleeve, the first control element movable along a slam-shut axis between an open first position, in which the first control element is spaced away from the first slam-shut valve seat, thereby allowing fluid flow through the first orifice, and a closed second position, in which the first control element is seated against the first slam-shut valve seat, thereby preventing fluid flow through the first orifice, wherein the one or more first flow ports of the first bonnet fluidly couple the inlet with a cavity formed in the first control element; and
  a first valve stem having a first end and a second end, the first valve stem operatively coupled to the first control element at the first end of the first valve stem and to a first trigger mechanism at the second end of the first valve stem, wherein the first trigger mechanism is responsive to pressure; and
 a second slam-shut safety device, comprising:
  a second bonnet coupled to the valve body, the second bonnet comprising a second sleeve extending into the flow path;
  a second control element movably disposed within the second sleeve, the second control element movable along the slam-shut axis between an open first position, in which the second control element is spaced away from the second slam-shut valve seat, thereby allowing fluid flow through the second orifice, and a closed second position, in which the second control element is seated against the second slam-shut valve seat, thereby preventing fluid flow through the second orifice; and
  a second valve stem having a first end and a second end, the second valve stem operatively coupled to the second control element at the first end of the second valve stem and to a second trigger mechanism at the second end of the second valve stem, wherein the second trigger mechanism is responsive to pressure,
 wherein each of the first and second control elements is pressure balanced.

18. The assembly of claim 17, wherein the first and second trigger mechanisms are configured to maintain the first valve stem and the second valve stem in respective retracted positions in first, armed states.

19. The assembly of claim 18, wherein the first and second trigger mechanisms are configured to release the first valve stem and the second valve stem, respectively, in second, tripped states.

20. The assembly of claim 17, wherein the first slam-shut safety device is coupled to a first port of the valve body and the second slam-shut safety device is coupled to a second port of the valve body, the second port being aligned with and opposite the first port.

21. The assembly of claim 17, further comprising a dynamic seal arranged between the second sleeve and the second control element.

22. The assembly of claim 17, wherein the first and second slam-shut valve seats are aligned with but spaced apart from one another within the valve body.

23. The assembly of claim 17, further comprising:
 a first bypass body coupled to the first control element and defining a first aperture arranged to facilitate fluid flow from a first side of the first control element to a second side of the first control element; and
 a second bypass body coupled to the second control element and defining a second aperture arranged to facilitate fluid flow from a first side of the second control element to a second side of the second control element.

24. The assembly of claim 17, wherein the second bonnet comprises one or more second flow ports formed in the second sleeve, wherein the one or more second flow ports of the first bonnet fluidly couple the second orifice and the outlet.

* * * * *

UNITED STATES PATENT AND TRADEMARK OFFICE
CERTIFICATE OF CORRECTION

| | | |
|---|---|---|
| PATENT NO. | : 11,125,348 B2 | |
| APPLICATION NO. | : 16/574602 | |
| DATED | : September 21, 2021 | |
| INVENTOR(S) | : Emil Groza et al. | |

It is certified that error appears in the above-identified patent and that said Letters Patent is hereby corrected as shown below:

In the Specification

At Column 5, Line 13, "control element 148" should be -- control assembly 148 --.

At Column 8, Line 57, "second control assembly 344" should be -- second control assembly 348 --.

Signed and Sealed this
Seventeenth Day of May, 2022

Katherine Kelly Vidal
*Director of the United States Patent and Trademark Office*